W. C. BOOZ.
PORTABLE DERRICK.
APPLICATION FILED JUNE 29, 1908.
12,915. Reissued Feb. 9, 1909.
3 SHEETS—SHEET 1.
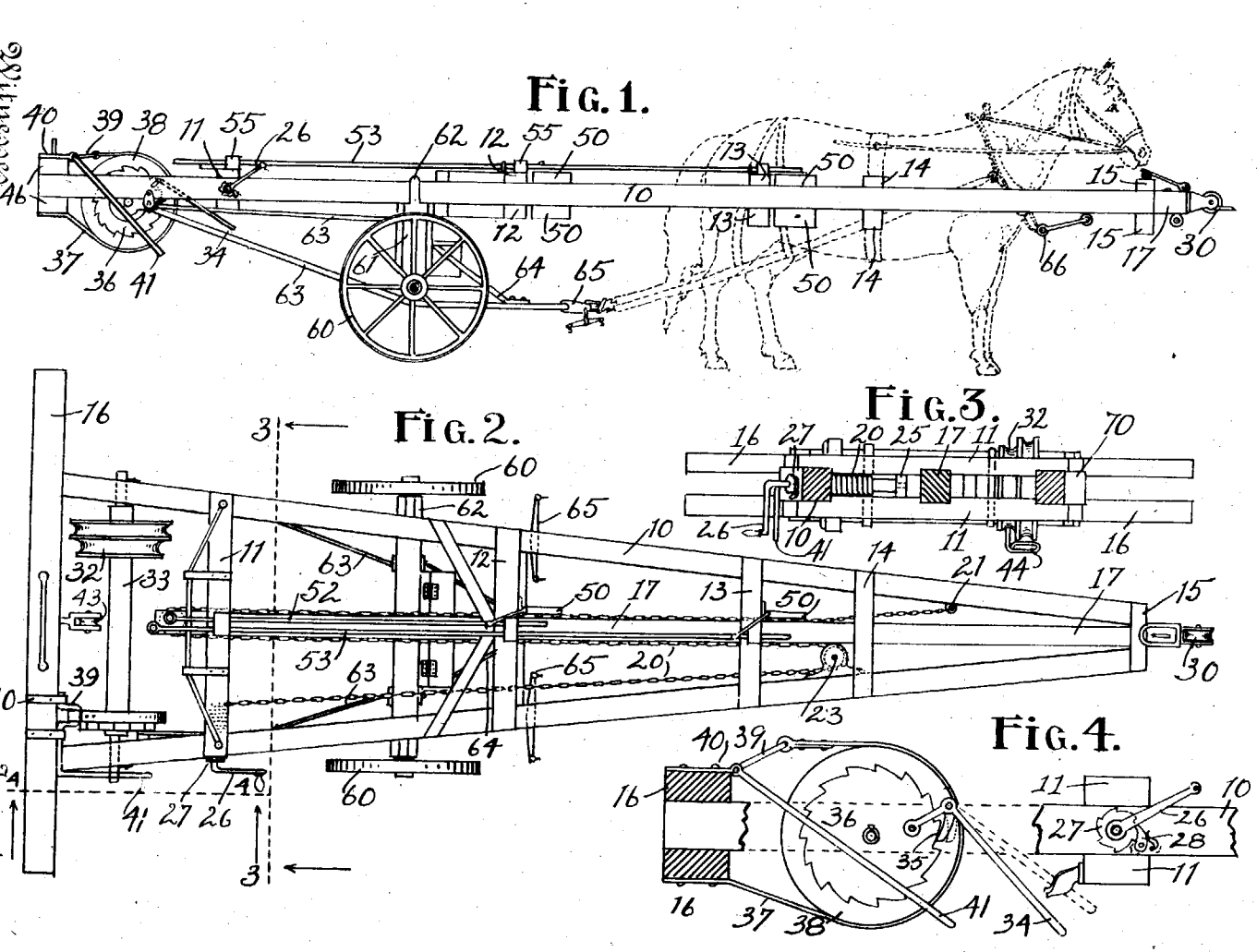
Witnesses
Earl D. French
Harriet P. Hunter
Inventor
William C. Booz
By his Attorney
J. M. W. Shelle

W. C. BOOZ.

PORTABLE DERRICK.

APPLICATION FILED JUNE 29, 1908.

12,915. Reissued Feb. 9, 1909.

3 SHEETS—SHEET 2.

Witnesses
Earl D. French
Harriet P. Hunter

Inventor
William C. Booz
By his Attorney
J. Merv. Shields

W. C. BOOZ.

PORTABLE DERRICK.

APPLICATION FILED JUNE 29, 1908.

12,915.

Reissued Feb. 9, 1909.

3 SHEETS—SHEET 3.

Witnesses
Earl D. French
Harriet P. Hunter

Inventor
William C. Booz
By his Attorney
Jno. W. Redfield

UNITED STATES PATENT OFFICE.

WILLIAM C. BOOZ, OF VANBUREN, INDIANA.

PORTABLE DERRICK.

No. 12,915. Specification of Reissued Letters Patent. Reissued Feb. 9, 1909.

Original No. 867,695, dated October 8, 1907, Serial No. 363,553. Application for reissue filed June 29, 1908. Serial No. 441,031.

*To all whom it may concern:*

Be it known that I, WILLIAM C. BOOZ, of Vanburen, county of Grant, and State of Indiana, have invented a certain new and useful Portable Derrick; and I do hereby declare that the following is a full, clear, and exact description thereof, reference being had to the accompanying drawings, in which like numerals refer to like parts.

The object of this invention is to provide improvements in portable derricks.

One new feature consists in the provision of removable trucks.

Another novel feature consists in the means for telescoping the one part of the derrick in another for shortening it for transportation.

Figure 5:
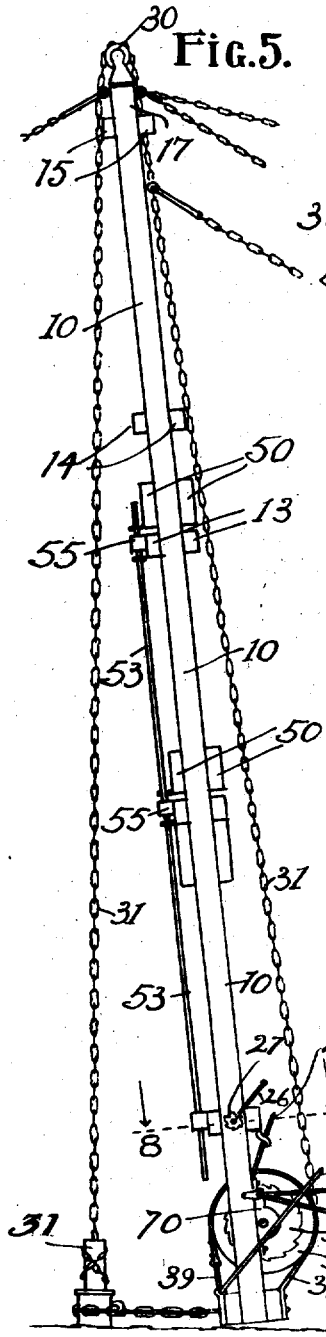
Figure 6:
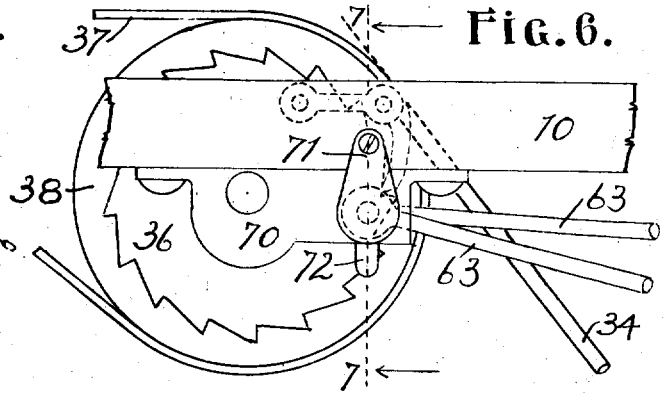
Figure 7:
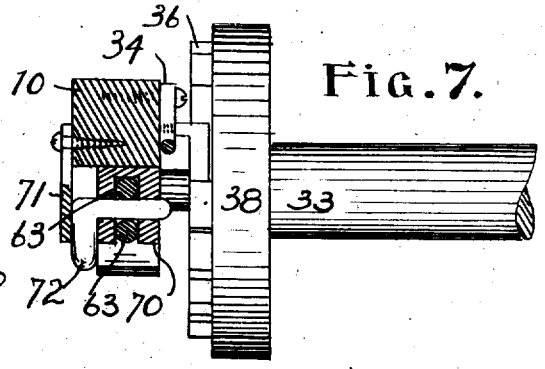
Figure 8:
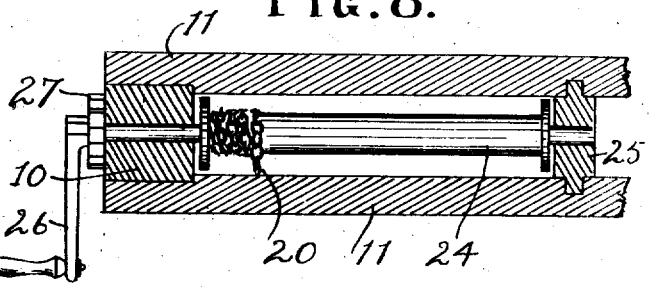
Figure 9:
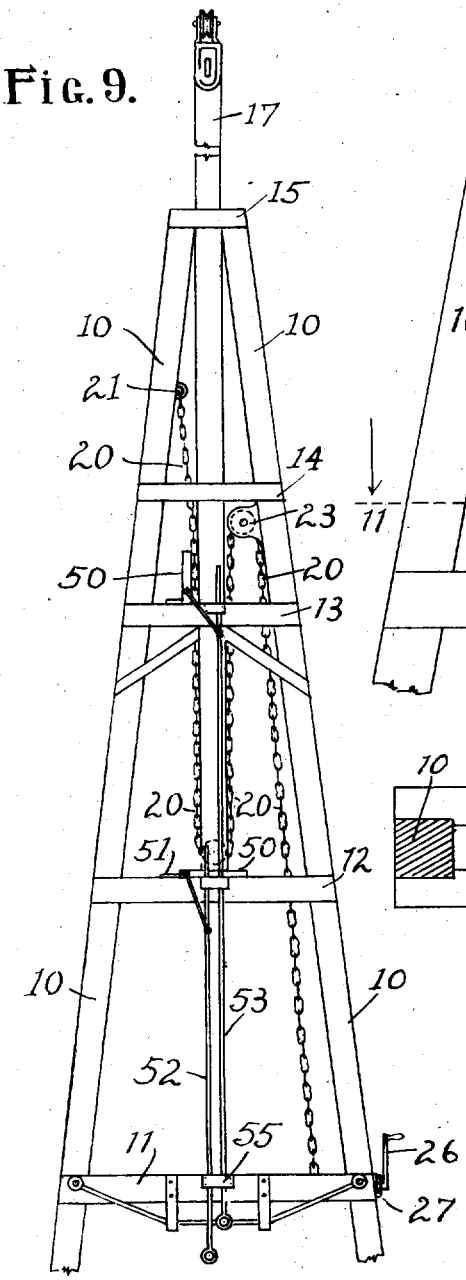
Figure 10:
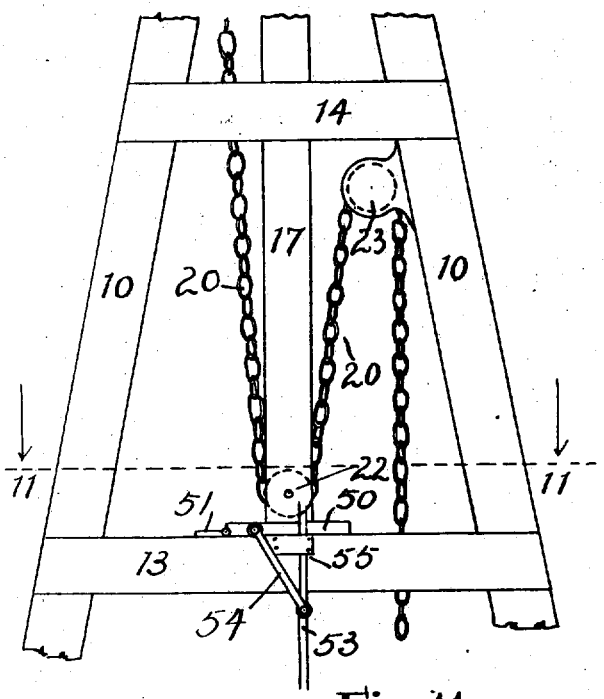
Figure 11:
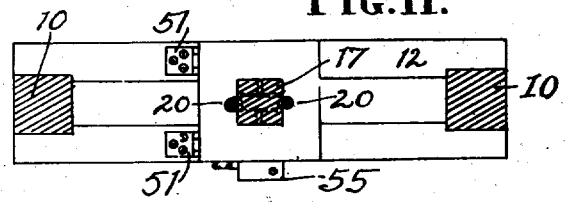
Figure 12:
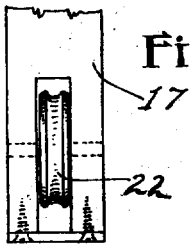

These and the other features will be understood from the accompanying drawings and the following description and claims:

In the drawings Figure 1 is a side elevation of the derrick mounted on the trucks ready for transportation, one horse of a team shown by dotted line. Fig. 2 is a plan view of the derrick on the truck ready for transportation. Fig. 3 is a section on the line 3—3 of Fig. 2. Fig. 4 is a section on the line 4—4 of Fig. 2 part of one of the derrick supporting beams being broken away to show the hand driving mechanism of the windlass and also the brake for the same. Fig. 5 is a side elevation of the derrick in its upright position sustained by guy wires and the truck ready to be removed. Fig. 6 is a side elevation of the hub of the windlass showing the means for attaching the trucks to the derrick. Fig. 7 is a section on the line 7—7 of Fig. 6 showing the pin that holds the truck to the derrick, the handle of the actuating lever of the drum being in section but the ratchet wheel, brake wheel and drum shown in elevation. Fig. 8 is a section on the line 8—8 of Fig. 5 showing the small hand windlass that actuates the telescoping member of the derrick. Fig. 9 is a front elevation of the derrick with the lower part broken away to show the telescoping part and the means for raising and lowering the staff. And also to show the means for sustaining the staff in its elevated position. Fig. 10 is a front elevation of the derrick with the upper and lower parts broken away to show the table on which the staff rests in its elevated position. Fig. 11 is a section on the line 11—11 of Fig. 10 showing the table down on the cross arms and the telescoping staff in place, the tables being hinged to the cross arms and raised or lowered by the hand rods that run parallel to the staff. A short arm is pivoted to the rod and table so that they may be raised or lowered at the will of the operator while he is standing on the ground. Fig. 12 is the lower end of the staff showing the base plate and a pulley.

In detail the derrick consists of a main portion consisting of the side beams 10, cross beams 11, 12, 13, 14 and 15 and the base beam 16, and a telescoping member or staff 17. The cross and base beams are in pairs, one beam of each pair being secured to each side of the side beams. The staff 17 telescopes between the pairs of cross beams as appears in Figs. 9, 10 and 11 and it is elevated by a cable 20 that is fastened at 21 to one side beam 10, and passes down under a pulley 22 in the lower end of the staff, thence up over a pulley 23 on the other side beam, and down to a windlass 24 mounted in one side beam 10, and a block 25 that is actuated by a crank 26, and held by a ratchet 27 and pawl 28, as appears in Figs. 4 and 8.

The staff 17 is supported in its elevated position by tables 50 hinged at 51 on the cross beams 12 and 13. These tables are pushed up out of the path of the staff 17 by the vertical rods 52 and 53, respectively, from which the connecting rods 54 extend to the tables. The lower ends of rods 52 and 53 operate through a guide or holder 55 on cross beam 11, where they may be operated by hand. When the staff is elevated from the position in Fig. 2 to that in Fig. 9, the lower table is closed down by pulling down rod 52. Then the lower table will support the staff as in Fig. 9. If it be desired to still further elevate the staff the upper table may be closed to support it. When the staff is to be lowered it is slightly elevated and the tables thrown up out of the way as shown in Fig. 2, whereupon the staff can be lowered without obstruction. This is done usually prior to transporting the derrick.

The upper end of the staff 17 carries a pulley 30 over which the main cable 31 extends from the work at 31′ as it is used for pulling oil wells. The cable 31 extends down from pulley 30 to one of the drums 32 on the shaft 33. This shaft may be hand-actuated by the crank lever 34 fulcrumed to the inside of a side beam 10, and carrying a pawl 35 for engaging the ratchet wheel 36 rigid on shaft 33. The shaft is held in its actuated position by the brake strap 37 that at one end is fastened to one base beam 16 and thence passes over the brake wheel 38, and at the other end is fastened to the crank rod 39 fulcrumed at 40 and operated by the hand lever 41.

The main cable 31 may be drawn by a team by passing it under pulley 43 on the base beams 16 and hitching a team to the cable. This cable has a guide 44 near the drum.

The truck for transporting the derrick consists of the wheels 60, bolster 61 and standards 62. The bolster and standards are adapted to receive the derrick, as seen in Figs. 1 and 2. Braces 63 extend rearwardly to the derrick and also a forwardly extending frame 64 receives the double-trees 65 to which the team is hitched. The double-trees are long enough to enable a horse to be hitched at each side of the derrick. A neck yoke 66 is attached to the derrick also.

The transporting means is attached to the derrick only at the rear end of the brace bars 63 in the manner illustrated in Figs. 5, 6 and 7. Brackets 70 are secured to each side beam 10 of the derrick and they are channeled to receive the looped ends of the brace rods 63, and when so inserted they are held in place by the pins 72 that are readily removable and are held in place by the plates 71 held by screws to the side beams 10. To detach the truck the plates 71 are pushed to one side and pins 72 withdrawn.

The tables 50, it will be observed, are flat blocks, plates or surfaces for holding up and bearing the weight of the shaft, mast or telescoping section or member, 17, making the operation of raising and lowering the shaft or member 17, simple, cheap, positive and efficient, necessary desiderations in this class of portable derricks.

Having described my invention, what I claim and desire to secure by Letters Patent is:

1. The combination with a derrick, of a two wheel truck upon which the derrick is adapted to be placed loosely, bars extending rearwardly from said truck that are detachably secured to the derrick and means for hitching a team to the truck and forward part of the derrick, substantially as shown.

2. The combination with a derrick, of a two wheel truck upon which the derrick is adapted to be placed loosely, channeled brackets secured to the derrick with holes in them, bars extending rearwardly from the truck to said brackets, and removable pins for coupling said bars to said brackets.

3. The combination with a derrick frame with cross beams, a telescoping member extending through the cross beams, means for elevating the telescoping member, and means on the cross beams movable into and out of position for stopping and holding the telescoping member in its elevated position.

4. The combination with a derrick frame having cross beams, of a telescoping member extending through the cross beams, means for elevating the telescoping member, hinged tables on the cross beams, and means for moving said tables into and out of the path of movement of the telescoping member.

5. In a portable derrick, the combination of a lower section, a mast section, said mast section telescoping within said lower section, a shaft connected to said lower section near its base, drums on said shaft and means for operating the same, together with plates as 71, and a truck connected by said plates to the device, said truck being peculiarly shaped to support the derrick in transportation, as set forth.

6. In a portable derrick, the combination of a base support, a lower section secured thereon, a mast section telescoping within said lower section, a shaft connected to said lower section near the base support, drums on said shaft and means for operating the latter, together with plates as 71, and a truck connected by said plates to the device, said truck having a cross bar shaped and adapted for holding the derrick in transportation, as set forth.

7. In a portable derrick, a lower member and an upper member, the upper member telescoping within the lower member, means for elevating and lowering the upper member, a supporting table, the upper member when elevated having its weight carried by the table, and means for operating said table to cause it to engage or disengage from the weight of the upper member, as set forth.

8. In a portable derrick, a lower section, an upper section, said upper section telescoping into said lower section, tables, said tables movably attached to the lower section, the weight of the upper section resting on said tables when it is in elevated position, a shaft connected to said lower section, drums on said shaft, means for operating same, and connecting parts as set forth.

9. In a portable derrick, a lower member and an upper member, the upper member telescoping into the lower member, means for elevating the telescoping member, and means on the lower member, movable into and out of position without impingement against the telescoping member when said member is being elevated, for stopping and holding the telescoping member in its elevated position, as set forth.

WILLIAM C. BOOZ.

Witnesses:
JNO. W. STREHLI,
G. W. ANDREW.